US 6,699,937 B1

(12) United States Patent
Scholl et al.

(10) Patent No.: US 6,699,937 B1
(45) Date of Patent: Mar. 2, 2004

(54) RUBBER COMPOSITIONS CONTAINING HYDROXYL GROUPS

(75) Inventors: Thomas Scholl, deceased, late of Bergisch Gladbach (DE), by Ulrike, Philipp, Christine, Johannes Scholl, legal representatives; Jürgen Trimbach, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 45 days.

(21) Appl. No.: 09/937,998

(22) PCT Filed: Mar. 20, 2000

(86) PCT No.: PCT/EP00/02452

§ 371 (c)(1),
(2), (4) Date: Jan. 23, 2002

(87) PCT Pub. No.: WO00/59994

PCT Pub. Date: Oct. 12, 2000

(30) Foreign Application Priority Data

Apr. 1, 1999 (DE) .......................................... 199 14 848

(51) Int. Cl.$^7$ .......................... C08L 9/00; C08L 25/02; C08L 33/02; C08L 33/18; C08L 33/20
(52) U.S. Cl. ...................... 525/210; 525/221; 525/232; 525/238; 525/241
(58) Field of Search ................................ 525/210, 221, 525/232, 238, 241

(56) References Cited

U.S. PATENT DOCUMENTS

| 3,873,489 | A | 3/1975 | Thurn et al. |
| 3,978,103 | A | 8/1976 | Meyer-Simon et al. |
| 5,227,425 | A | 7/1993 | Rauline ....................... 524/493 |
| 5,663,226 | A | 9/1997 | Scholl et al. ................ 524/262 |
| 6,252,008 | B1 | 6/2001 | Scholl et al. ............. 525/333.5 |
| 6,268,421 | B1 | 7/2001 | Diitrich et al. .............. 524/266 |
| 6,319,994 | B2 * | 11/2001 | Scholl et al. ............. 525/333.5 |
| 2001/0018495 | A1 | 8/2001 | Scholl et al. ................ 525/231 |

FOREIGN PATENT DOCUMENTS

| CA | 2186060 | 3/1997 |
| EP | 0 464 478 | 1/1992 |
| EP | 0 334 042 | 11/1993 |
| EP | 0 974 616 | 4/1997 |
| EP | 0 806 452 | 11/1997 |
| EP | 0 447 066 | 8/2000 |

OTHER PUBLICATIONS

I. Franta, Elastomers & Rubber Compounding Materials, Elsevier, 1989, pp. 73–74 and 92–94, Addition Polymerization by Anionic Mechanism.

* cited by examiner

Primary Examiner—Nathan M. Nutter
(74) Attorney, Agent, or Firm—Joseph C. Gil; Noland J. Cheung; Jennifer R. Seng

(57) ABSTRACT

The invention relates to rubber compounds that contain rubbers polymerized in solution with a secondary hydroxyl group content of 0.1 to 5 wt.-% that are not more than 4 carbon atoms away from the respective side chain end. The invention also relates to mixtures thereof with fillers, optionally additional rubbers and rubber auxiliary agents and the vulcanized rubbers produced thereof. The inventive rubber compounds are useful for producing highly reinforced, abrasion-resistant molded bodies, especially for producing tires that are characterized by excellent non-skid properties on wet surfaces.

9 Claims, No Drawings

RUBBER COMPOSITIONS CONTAINING HYDROXYL GROUPS

FIELD OF THE INVENTION

The present invention relates to rubber mixtures containing rubbers polymerised in solution with a secondary hydroxyl group content of 0.1 to 5 wt. %, which groups arc no further than 4 carbon atoms away from the respective side chain end, and to their mixtures with fillers, optionally further rubbers and rubber auxiliary agents and vulcanisates produced therefrom. The rubber mixtures according to the invention are suitable for producing highly reinforced abrasion-resistant moulded articles, in particular for producing tyres which have a particularly high skid resistance in the wet and low rolling resistance.

BACKGROUND OF THE INVENTION

Double-bond containing anionically polymerised solution rubbers, such as solution polybutadiene and solution styrene6butadiene rubbers have advantages over corresponding emulsion rubbers in the production of low rolling resistance tyre treads. The advantages are inter alia the controllability of the vinyl content and the glass transition temperature associated therewith and the molecular branching. These result in particular advantages in the relationship between skid resistance in the wet and rolling resistance of the tyre in practical application. Thus, U.S. Pat. No. 5 227 425 describes the production of tyre treads from a solution SBR rubber and silica. To further improve the properties, numerous methods for end group modification have been developed, as described for example in EP-A 334 042, with dimethylaminopropyl acrylamide or, as described in EP-A 447 066, with silylethers. Owing to the high molecular weight of the rubbers the content by weight of the end group is low, however, and can therefore influence the interaction between filler and rubber molecule to only a small degree. It was an object of the present invention to produce solution SBR rubbers with a much higher content of active groups for filler interaction.

A further object of the present invention was the production of rubber vulcanisates with a more favourable skid resistance in the wet/rolling resistance relationship. Hydroxyl group-containing solution polybutadiene rubbers are also described in DE-OS 2 653 144. However, these rubbers are not suitable as main components in tyre treads owing to their insufficient strength.

EP-A 464 478 describes a process for hydroxylation of rubbers, the hydroxylated rubbers differing structurally from those of the present invention. In particular, the secondary hydroxyl groups of EP-A 464 478 are located in a less favourable position in the polymer and are therefore far less effective than the hydroxyl groups of the present invention which are located no further than four carbon atoms away from the respective side chain end.

EP-806 452 Al also describes hydroxyl group-containing emulsion and solution rubbers, the hydroxyl proportions for solution rubbers described here lying in a much lower range (0.009 to 0.061%) as a result of the process. The present patent application shows that these proportions do not have any significant influence on the skid resistance in the wet and that the position of the hydroxyl groups is of particular importance.

The earlier applications DE-198 32 459.6 and DE-198 32 458.8 describe hydroxyl group-containing solution rubbers. They do not, however, describe secondary hydroxyl groups and do not mention that the hydroxyl groups are located no more than 4 carbon atoms from the respective side chain end either.

SUMMARY OF THE INVENTION

It has now been found that rubber mixtures and rubber vulcanisates with surprisingly improved dynamic cushioning properties in the temperature range (0 to 20 ° C.) relevant to skid resistance in the wet and in the temperature range (60 to 80 ° C.) relevant to rolling resistance and improved abrasion behaviour may be produced from hydroxyl group-containing solution vinyl aromatic/diolefin rubbers with a content of 0.1 to 5 wt. % bound secondary hydroxyl groups located no further than 4 carbon atoms from the respective side chain end and with a 1,2 vinyl content of 5 to 60 wt. %. Further surprising advantages were obtained when the rubber mixture was produced not in the kneader as is conventional, but by mixing a solution of hydroxyl group containing rubber and oxidic or silicate-containing filler in organic solvent and subsequently removing the solvent with water vapour as the filler is then precipitated completely with the rubber and does not remain in the waste water, as is the case when using unmodified rubber.

DETAILED DESCRIPTION OF THE INVENTION

The present invention therefore relates to rubber mixtures containing one or more hydroxyl group-containing rubbers polymerised in solution and synthesised from diolefins and vinyl aromatic monomers containing bound secondary hydroxyl groups in the range of 0.1 to 5 wt. %, characterised in that the secondary hydroxyl groups are located no further than 4 carbon atoms away from the respective side chain end. The invention also relates to the use of said rubber mixtures for producing rubber vulcanisates, in particular silica-filled tyre treads with particularly high abrasion resistance, particularly high skid resistance in the wet and low rolling resistance.

The vinyl aromatic/diolefin rubbers polymerised in solution advantageously have mean molecular weights (numerical average) of 50,000 to 2,000,000 and glass transition temperatures of –50° to +20° C. Preferred proportions of vinyl aromatic are between 0.01 to 50 wt. %, particularly preferably between 5 to 40 wt. %.

Suitable vinyl aromatic monomers are styrene, o-, m- and p-methyl styrene, p-tert.butyl styrene, α-methyl styrene, vinyl naphthalene, divinyl benzene, trivinyl benzene and divinyl naphthalene. Styrene is particularly preferred.

Suitable diolefins are all diolefins known to the person skilled in the art, in particular 1,3-butadiene, isoprene, 1,3-pentadiene, 2,3-dimethylbutadiene, 1-phenyl-1,3-butadiene and 1,3-hexadiene. 1,3-butadiene and isoprene are particularly preferred. The rubbers according to the invention for the rubber mixtures according to the invention are preferably produced by anionic solution polymerisation, i.e. by means of a catalyst based on alkali metal, for example n-butyl lithium, in a hydrocarbon as solvent. The known randomisers and control agents can also be used for the micro-structure of the polymer. Such anionic solution polymerisations are known and described, for example, in 1. Franta Elastomers and Rubber Compounding Materials; Elsevier 1989, page 73 to 74, 92 to 94 and in Houben-Weyl, Methoden der Organis-chen Chemie, Thieme Veriage, Stuttgart, 1987, Vol. E20, pages 114 to 134. The hydroxyl groups are introduced in a subsequent reaction to the final polymer. A preferred method for introducing hydroxyl groups is, for example, the addition of hydroxyl group-containing mercaptans.

Examples of suitable alkali metal polymerisation catalysts in the sense of the present invention are lithium, sodium, potassium, rubidium, caesium metal and their hydro-carbon compounds and complex compounds with polar organic compounds.

Lithium and sodium hydrocarbon compounds with 2 to 20 carbon atoms, for example ethyl lithium, n-propyl lithium, i-propyl lithium, n-butyl lithium, sec-butyl lithium, tert.-octyl lithium, n-decyl lithium, phenyl lithium, 2-naphthyl lithium, 2-butyl phenyl lithium, cyclohexyl lithium, 4-cyclopentyl lithium, 1,4-dilithiobut-2-ene, sodium naphthalene, sodium biphenyl, potassium-tetrahydrofuran complex, potassium-diethoxyethane complex, sodium-tetramethylethylene diamine complex are particularly preferred. The catalysts can be used alone or in a mixture.

Preferred catalyst quantities are between 0.2 and 15 mMol/100 g of polymer.

The anionic solution polymerisation is carried out in a hydrocarbon or in another solvent which does not adversely affect the catalyst, for example tetrahydrofuran, tetrahydropyran or 1,4-dioxan. Hydrocarbons suitable as solvent are, for example, aliphatic, cycloaliphatic or aromatic hydrocarbons with 2 to 12 carbon atoms. Preferred solvents are propane, butane, pentane, hexane, cyclohexane, propene, butene, 1-pentene, 2-pentene, 1-hexene, 2-hexene, benzene, toluene, xylene. The solvents can be used alone or in a mixture.

The hydroxyl groups are preferably introduced by adding hydroxyl mercaptans of general formula (1), hydroxyl group-containing mercaptocarboxylic acid esters of general formula (2) and/or hydroxyl mercaptans (3). The reaction is preferably carried out in solution, optionally in the presence of radical starters.

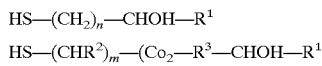  (1)

  (2)

(3)

wherein
R$^1$ represents a C$_1$ to C$_3$-alkyl group, which can optionally bear further hydroxyl groups
R$^2$ represents hydrogen, a C$_1$ to C$_6$-alkyl group or a —C$_2$—R$^3$—CHOH—R$^1$ group and
R$^3$ represents a linear, branched or cyclic C$_2$ to C$_{36}$-alkyl group which can optionally be substituted by up to 6 further hydroxyl groups or can be interrupted by nitrogen, oxygen or sulphur atoms,
OH represents a secondary hydroxyl group,
n, m independently from one another represents an integer from 1 to 7, q represents an integer in the range of 3 to 4.

Preferred hydroxyl mercaptans are 1-mercapto-2-propanol, 1-mercapto-2-butanol, 1-mercapto-3-butanol, 1-mercapto-2-pentanol, 1-mercapto-2-hydroxy-cyclohexane and 1-mercaptopropanediol 1-mercapto-2-propanol, 1-mercapto-2-butanol, 1-mercapto-2-hydroxy-cyclohexane and 1-mercaptopropanediol (thioglycerol) are particularly preferred.

Preferred hydroxyl group-containing mercaptocarboxylic acid esters are monoesters of mercapto acetic acid, mercapto propionic acid, mercapto butyric acid and mercapto succinic acid with 1,2-propylene glycol, 1,2- and 1,3-butylene glycol, dipropylene glycol, tripropylene glycol, tetrapropylene glycol, glycerol, sorbitol. The corresponding esters of 3-mercapto propionic acid are particularly preferred.

Most particularly preferred are hydroxyl mercaptans and hydroxyl group-containing mercapto carboxylic acid esters which, in addition to the specific secondary hydroxyl group, bear a further hydroxyl group in the second or third position, such as thioglycerol.

Suitable radical starters for adding the hydroxyl mercaptans to the solution rubbers are, for example, azo initiators, such as azobisisobutyric acid nitrile, asobiscyclohexane nitrile and peroxides, such as dilauroyl peroxide, benzpinacols and benzpinacol silyl ether or photo initiators in the presence of visible or UV light. Particularly preferred are diacyl peroxides, in particular di-(3,3,5-trimethyl hexanoyl) peroxide, didecanoyl peroxide and dilauroyl peroxide.

Preferred quantities of radical starters are in the range of 0.5 to 20 wt. %, based on hydroxyl mercaptan.

The Mooney viscosity ML 1+4 of the copolymers is in the range of 10 to 200, preferably 30 to 150, measured at 100° C.

The content of polymerised 1,2-butadiene units ("vinyl content") is in the range of 5 and 60 wt. %, preferably 10 to 50 wt. %.

The content of polymerised vinyl aromatic is in the range of 0.01 to 40 wt. %, preferably of 5 to 40 wt. %, particularly preferably 10 to 30 wt. %. The content of secondary hydroxyl groups is in the range of 0.1 to 5 wt. %, preferably in the range of 0.1 to 3 wt. %, particularly preferably in the range of 0.1 to 2 wt. %, most particularly preferably in the range of 0.1 to 1 wt. %, based on rubber. The process according to the invention therefore allows targeted introduction of hydroxyl groups as a function of the desired removal from the side chain end.

The content of hydroxyl groups can be determined by known methods, in other words, for example by spectroscopy, tritrimetry, elementary analysis or by determining the so-called hydroxyl value, in other words by reaction with reagents which eliminate titratable acids in contact with OH groups. See DIN 53 240 in this regard.

Of course, in addition to the specific secondary hydroxyl groups, which are no fiber than 4 carbon atoms away from the respective side chain end, the rubbers can also contain further functional groups, such as carboxylic acid and carboxylic acid ester groups.

The hydroxyl group-containing rubbers polymerised in solution can be used alone, in a blend with aromatic or aliphatic oils or in a mixture with other rubbers. In addition to natural rubber, synthetic rubbers are also suitable as additional rubbers for the production of rubber vulcanisates. Preferred synthetic rubbers are described, for example, in W. Htofmann, Kautschuktechnologie, Gentner Verlag, Stuttgart 1980 and 1. Franta, Elastomers and Rubber Compounding Materials, Elsevier, Amsterdam 1989.

They comprise inter alia
BR—polybutadiene
ABR—butadienelacrylic acid-C$_1$ to C$_4$-alkyl ester-copolymers
CR—polychloroprene
IR—polyisoprene
SBR—styrenelbutadiene rubber copolymers with styrene proportions of 1 to 60, preferably 20 to 50 wt. %
IIR—isobutylene/isoprene rubber copolymers
NBR—butadiene acrylonitrile rubber copolymers with acrylonitrile proportions of 5 to 60, preferably 10 to 40 wt. %

HNBR—partially hydrogenated or completely hydrogenated NBR rubber

EPDM—ethylenelpropylene/diene copolymers and mixtures of these rubbers. Natural rubber, emulsion SBR and solution SBR rubbers with a glass transition temperature above −50° C., which can optionally be modified with silyl ethers or other functional groups, as described for example in EP-A-447 066, polybutadiene rubber with high 1,4-cis-content (>90%), which is produced with catalysts based on Ni, Co, Ti or Nd, and polybutadiene rubber with a vinyl content of 0 to 75% and mixtures thereof are of particular interest for the production of motor vehicle tyres.

The rubber mixtures according to the invention contain 5 to 500 parts by weight of an active or inactive filler, such as

- highly dispersed silicas, produced, for example, by precipitating solutions of silicates or flame hydrolysis of silicon halides with specific surface areas of 5 to 1,000, preferably 20 to 400 m$^2$/g (BET surface area) and with primary particle sizes of 10 to 400 nm. The silicas can optionally also be present as mixed oxides with other metal oxides, such as Al-, Mg-, Ca-, Ba-, Zn-, Zr-, Ti-oxides,
- synthetic silicates, such as aluminium silicate, alkaline earth silicate such as magnesium silicate or calcium silicate, with BET surface areas of 20 to 400 m$^2$/g and primary particle diameters of 10 to 400 nm,
- natural silicates, such as kaolin and other naturally occurring silicas,
- glass fibres and glass fibre products (mats, strands) or glass microbeads,
- metal oxides, such as zinc oxide, calcium oxide, magnesium oxide, aluminium oxide,
- metal carbonates, such as magnesium carbonate, calcium carbonate, zinc carbonate,
- metal hydroxides, such as aluminium hydroxide, magnesium hydroxide,
- carbon blacks. The carbon blacks to be used in this case are produced by the lamp black, furnace black or gas black process and have BET surface areas of 20 to 200 m$^2$/g, such as SAF, ISAF, HAF, FEF or GPF carbon blacks.
- rubber gels, in particular those based on polybutadiene, butadiene/styrene copolymers, butadicne/acrylonitrile copolymers and polychloroprene.

Highly dispersed silicas and carbon blacks are particularly preferred. The oxidic and silica fillers can be activated and/or hydrophobised with the known filler activators, in particular sulphur-containing silyl ethers and/or known hydrophobing agents.

The above-mentioned fillers can be used alone or in a mixture. In a particularly preferred embodiment the rubber mixtures contain a mixture of light fillers, such as highly dispersed silicas, and carbon blacks as filler, wherein the mixing ratio of light fillers to carbon blacks is 0.05 to 20, preferably 0.1 to 10.

The fillers are preferably added as solids or as suspension in water or a solvent to the solution of the hydroxyl group-containing rubber or rubbers polymerised in solution.

The rubber solution can be produced in advance, but the solution originating from the polymerisation is preferably used directly. The solvent is subsequently removed thermally or preferably with the aid of steam. The conditions of this stripping process may be easily determined by preliminary tests.

The fillers are also preferably added to the solid hydroxyl-group containing rubber or a mixture of rubbers and mixed in in a known manner, for example with a kneader.

The rubber mixtures according to the invention optionally also contain crossinking agents. Sulphur or peroxides can be used as crosslinking agents, sulphur being particularly preferred. The rubber mixtures according to the invention can contain further rubber auxiliary products, such as reaction accelerators, antioxidants, heat stabilisers, light protection agents, anti-ozonants, processing aids, plasticisers, tackifiers, blowing agents, dyes, pigments, waxes, extenders, organic acids, retarders, metal oxides and activators such as triethanolamine, polyethylene glycol, trimethylol propane etc. which are known in the rubber industry.

In the preferred rubber mixtures with highly active precipitated silicas, use of additional filler activators is particularly advantageous. Preferred filler activators are sulphur-containing silyl ethers, in particular bis-(trialkoxysilyl-alkyl)-polysulphides, as described in DE 2 141 159 and DE-AS 2 255 577, oligomeric and/or polymeric sulphur-containing silyl ethers of DE-OS 4 435 311 and EP-A 670 347, mercaptoalkyltrialkoxysilanes, in particular mercaptopropyltriethoxysilane and thiocyanatoalkylsilylethers, as described, for example, in DE-OS 19 544 469.

The rubber auxiliary agents (see also J. Franta in Elastomers and Rubber Compounding Materials, Elsevier, 1989) are used in conventional quantities which depend *inter alia* on the intended application. Conventional quantities are, for example, quantities of 0.1 to 50 wt. %, based on rubber.

The rubber mixtures according to the invention are eminently suitable for producing moulded article of all kinds.

Non-limiting examples of these moulded articles are 0-rings, profiles, seals, diaphragms, tyres, tyre treads, cushioning elements and tubes.

Tyres and tyre treads are particularly preferred.

EXAMPLE 1

25 g 1-mercapto 2-propanol and 2 g azobiscyclohexane nitrite are added to a solution of 500 g solution SBR rubber Buna® VSL 5025-0 (Bayer AG, content of bound styrene 25 wt. %, content of 1,2-bound butadiene 50 wt. %) in 4 l of cyclohexane at 70° C. The mixture was then stirred for 16 hours at 80° C. 2.5 g of antioxidant Vulkanox® BKF (Bayer AG) were then added and the solvent distilled off with water vapour. After drying at 70° C. under vacuum a colourless rubber with the glass transition temperature (DSC) of −6° C. and OH content of 0.9 wt. % was obtained.

EXAMPLE 2

The process was carried out as in Example 1, using the following quantities:

500 g Bunan® VSL 5025-0 (Bayer AG)

4 l cyclohexane 12.5 g 1-mercapto-2-propanol 1 g dilauroyl peroxide (as replacement for azobiscyclohexane nitrite) (Interox LP, Peroxid Chemie, D)

Reaction temperature: 3 hours at 80° C. 2.5 g of antioxidant Vulkanox® 4020 (Bayer AG) were then added. A colourless rubber with a glass transition temperature of −13° C. and an OH content of 0.45 wt. % was obtained.

COMPARISON EXAMPLES

The process was carried out as in Example 1, using the following quantities:

TABLE 1

| Comparison example | Solution SBR B.VSL 5025-0 | Hydroxyl mercaptan | Radical starter and length of reaction | Glass transition temperature | OH content in the end product |
|---|---|---|---|---|---|
| 1 | 500 g | 1.6 g 1-mercapto-2-ethanol | 0.2 g azobiscyclohexane nitrile 16 hours/80° C. | −18° C. | 0.07 wt % |
| 2 (according to EP 464,478) | 500 g | 73.5 g 1-mercapto-2-hydroxy-dodecane | 1 g dilauroyl peroxide 3 hours/80° C. | −27° C. | 1.0 wt. % |

EXAMPLE 3

The following rubber mixtures (except for sulphur and accelerator) were produced at 140° to 150° C. in a 1.5 l kneader. Mixing duration in the kneader: 5 minutes. Sulphur and accelerator were subsequently added at approximately 50° to 70° C. on a roller.

TABLE 2

| Components | Comparison example 3.A | Comparison example 3.B | Comparison example 3.C | Example 3.1 according to the invention |
|---|---|---|---|---|
| Solution SBR rubber Buna ® VSL 5025-0 (Bayer AG) | 70 | 0 | 0 | 0 |
| Rubber according to Example 1 | 0 | 0 | 0 | 70 |
| Rubber according to comparison Example 1 (EP 806 452) | 0 | 0 | 70 | 0 |
| Rubber according to comparison Example 2 (EP 464 478) | 0 | 70 | 0 | 0 |
| BR rubber Buna ® CB25 (Bayer AG) | 30 | 30 | 30 | 30 |
| Silica Vulkasil ® S (Bayer AG) | 70 | 70 | 70 | 70 |
| Aromatic mineral oil Enerthene 1849-1 (BP) | 37.5 | 37.5 | 37.5 | 37.5 |
| Silane Si 69 (Degussa) | 6 | 6 | 6 | 6 |
| Carbon black N 121 (Degussa) | 10 | 10 | 10 | 10 |
| Zinc oxide RS ® (Bayer) | 2.5 | 2.5 | 2.5 | 2.5 |
| Stearic acid | 1 | 1 | 1 | 1 |
| Vulkanox ® 4020 (Bayer) | 1 | 1 | 1 | 1 |
| Sulphur (Kali Chemie, D) | 1.5 | 1.5 | 1.5 | 1.5 |
| Vulkacit ® CZ | 1/8 | 1.8 | 1.8 | 1.8 |
| Vulkacit ® D | 2 | 2 | 2 | 2 |

The rubber mixtures were then vulcanised for 20 minutes at 170° C. The vulcanisates had the following properties;

TABLE 3

| Vulcanisate prperty | Comparison example 3.A | Comparison example 3.B | Comparison example 3.C | Example 3.1 according to the invention |
|---|---|---|---|---|
| Tensile strength (Mpa)[(1)] | 14.6 | 16.3 | 14.6 | 12.6 |
| Elongation at break (%)[(1)] | 390 | 380 | 380 | 275 |
| Modulus at 100% elongation (Mpa)[(1)] | 3 | 3 | 2.9 | 3.7 |
| Shore A hardness (23° C.)[(2)] | 73 | 69 | 72 | 73 |
| Shore A hardness (70° C.)[(2)] | 69 | 65 | 69 | 69 |
| Rebound resilience at 23° C. (%)[(3)] | 28 | 28 | 28 | 22 |
| Rebound resilience at 70° C. (%)[(3)] | 47 | 49 | 49 | 49 |
| Difference between the rebound resiliences at 23° and 70° C. | 19 | 21 | 21 | 27 |
| Abrasion to DIN 53,516 (ccm) | 104 | 83 | 98 | 75 |

[(1)]determined by tensile test to DIN 52 504 with standard test piece 2
[(2)]determined to DIN 53 505
[(3)]determined to DIN 53 512

(1) determined by tensile test to DIN 52 504 with standard test piece 2
(2) determined to DIN 53 505
(3) determined to DIN 53 512

The test results show that the properties of the rubber according to the invention with specific content and arrangement of the hydroxyl groups were improved with respect to the unmodified rubber (comparison 3.A), the rubbers with the same hydroxyl group content (1 wt. %, comparison 3.B) and with insufficient hydroxyl group content (0.07 wt%, comparison 3.C.). A much lower rebound resilience was measured at ambient temperature which, experience has shown, is accompanied by a considerable improvement in the skid resistance in the wet, The difference between the rebound resiliences at ambient temperature and 70° C. is much greater in the rubber mixtures according to the invention, so the relationship of skid resistance in the wet and rolling resistance in the tyres is also much more favourable.

EXAMPLE 4

4.15 g thioglycerol (3-mercapto-1,2-propane diol) and 0.5 dilauroyl peroxide were added to a solution of 500 g solution rubber Buna VSL 5025-0 (Bayer AG) in 4 l cyclohexane at 80° C. and stirred for 2 hours at 80° C. 2.5 g Vulkanox 4020 (antioxidant from Bayer AG) were then added, the solvent distilled off with water vapour. After drying at 70° C. under vacuum, 504.1 g of rubber with the viscosity ML 1+4 (100° C.) 70 and an OH content of 0.26 wt. % were obtained.

EXAMPLE 5

The following rubber mixtures (except for sulphur and accelerator) were produced at 140° C. in a 1.5 l kneader.

Mixing duration in the kneader: 5 minutes. Sulphur and accelerator were subsequently added at approximately 50° C. to 70° C. on a roller.

TABLE 4

| Components | Comparison example 5.A | Example 5.1 according to the invention |
|---|---|---|
| Solution SBR rubber Buna ® VSL 5025-0 (Bayer AG) | 70 | 0 |
| Rubber according to Example 4 | 0 | 70 |
| BR rubber Buna ® CB25 (Bayer AG) | 30 | 30 |
| Silica Vulkasil ® S (Bayer AG) | 70 | 70 |
| Aromatic mineral oil Enerthene 1849-1 (BP) | 37.5 | 37.5 |
| Silane Si 69 (Degussa) | 5.6 | 5.6 |
| Carbon black N 121 (Degussa) | 10 | 10 |
| Zinc oxide RS ® (Bayer) | 3 | 3 |
| Stearic acid | 1 | 1 |
| Vulkanox ® HS (Bayer) | 1 | 1 |
| Vulkanox ® 4020 (Bayer) | 1 | 1 |
| Sulphur | 1.5 | 1.5 |
| Vulkacit ® CZ | 1.8 | 1.8 |
| Vulkacit ® D | 2 | 2 |

The rubber mixtures were the vulcanised for 20 minutes at 170° C.

The vulcanisates had the following properties:

TABLE 5

| Vulcanisate property | Comparison example 5.A | Example 5.1 according to the invention |
|---|---|---|
| Tensile strength (Mpa)[(1)] | 15.6 | 19.6 |
| Elongation at break (%)[(1)] | 380 | 400 |
| Modulus at 100% elongation (Mpa)[(1)] | 1.8 | 1.4 |
| Shore A hardness (23° C.)[(2)] | 72 | 65 |
| Shore A hardness (70° C.)[(2)] | 69 | 65 |
| Rebound resilience at 23° C. (%)[(3)] | 28 | 25 |
| Rebound resilience at 70° C. (%)[(3)] | 46 | 50 |
| Difference between the rebound resiliences at 23° and 70° C. | 22 | 25 |
| Tan delta 0° C. | 0.387 | 0.562 |
| Tan delta 60° C. | 0.153 | 0.11 |

[(1)]determined by tensile test to DIN 52 504 with standard test piece 2
[(2)]determined to DIN 53 505
[(3)]determined to DIN 53 512

(1) determined by tensile test to DIN 52 504 with standard test piece 2

(2) determined to DIN 53 505

(3) determined to DIN 53 512

The test results show that the cushioning properties of the rubber according to the invention with specific content and arrangement of the hydroxyl groups were much improved with respect to the unmodified rubber (comparison 5.A). A much lower rebound resilience was measured at ambient temperature and a higher tan delta at 0° C. which, experience has shown, are both accompanied by a considerable improvement in the skid resistance in the wet. The higher rebound resiliences at 70° C. and the lower tan delta at 60° C. of the rubber mixture according to the invention both show a lower rolling resistance with respect to the reference rubber mixture without the content of hydroxyl groups according to the invention. The difference between the rebound resiliences at ambient temperature and 70° C. and between the tan delta values at 0 and 60° C. is much greater in the rubber mixture according to the invention, so the relationship of skid resistance in the wet and rolling resistance in the tyres is also much more favourable.

What is claimed is:

1. Rubber mixtures comprising one or more hydroxyl group-containing rubbers polymerized in solution and synthesized from diolefins and vinyl aromatic monomers containing bound secondary hydroxyl groups in the range of 0.1 to 5 wt. %, wherein said secondary hydroxyl groups are located no further than 4 carbon atoms away from the respective side chain end.

2. Rubber mixtures according to claim 1, wherein said hydroxyl group-containing rubber or rubbers polymerized in solution have a content of polymerized vinyl aromatic in the range of 5 to 40 wt. % and a 1,2 vinyl content in the range of 5 to 60 wt. %.

3. Rubber mixtures according to claim 1, wherein styrene is used as a vinyl aromatic monomer.

4. Rubber mixtures according to claim 1, wherein said diolefins are 1,3-butadiene or isoprene.

5. Molded articles containing rubber mixtures which comprise one or more hydroxyl group-containing rubbers polymerized in solution and synthesized from diolefins and vinyl aromatic monomers containing bound secondary hydroxyl groups in the range of 0.1 to 5 wt. %, wherein said secondary hydroxyl groups are located no further than 4 carbon atoms away from the respective side chain end.

6. A molded article according to claim 5, wherein said molded article is a tire tread.

7. Rubber mixtures according to claim 1, wherein said hydroxyl groups are introduced by adding hydroxyl mercaptans of the general formula (1), hydroxyl group containing mercaptocarboxylic acid esters of the general formula (2) or hydroxyl mercaptans of the general formula (3):

$$HS-(CH_2)_n-CHOH-R^1 \qquad (1)$$

$$HS-(CHR^2)_m-(CO_2-R^3-CHOH-R^1) \qquad (2)$$

$$HS-CH\,CH-OH \qquad (3)$$

$$(CH_2)_q$$

wherein $R^1$ represents a $C_1$ to $C_3$-alkyl group, which can optionally bear further hydroxyl groups $R^2$ represents hydrogen, a $C_1$ to $C_6$-alkyl group or a $-CO_2-R^3-CHOH-R^1$ group and $R^3$ represents a linear, branched or cyclic $C_2$ to $C_{36}$-alkyl group which can optionally be substituted by up to 6 further hydroxyl groups or can be interrupted by nitrogen, oxygen or sulphur atoms, OH represents a secondary hydroxyl group, n, m independently from one another represents an integer from 1 to 7, q represents an integer in the range of 3 to 4.

8. Rubber mixtures according to claim 7, wherein the hydroxyl mercaptans are selected from the group consisting of 1-mercapto-2-propanol, 1-mercapto-2-butanol, 1-mercapto-3-butanol, 1-mercapto-2-pentanol, 1-mercapto-2-hydroxy-cyclohexane and 1-mercaptopropanediol, 1-mercapto-2-propanol, 1-mercapto-2-butanol, 1-mercapto-2-hydroxy-cyclohexane and 1-mercaptopropanediol (thioglycerol).

9. Rubber mixtures according to claim 7, wherein the hydroxyl group-containing mercaptocarboxylic acid esters are selected from the group consisting of monoesters of mercapto acetic acid, mercapto propionic acid, mercapto butyric acid, mercapto succinic acid with 1,2-propylene glycol, 1,2- and 1,3-butylene glycol, dipropylene glycol, tripropylene glycol, tetrapropylene glycol, glycerol, sorbitol and esters of 3-mercapto propionic acid.

* * * * *